April 25, 1939.  W. E. KNAPP  2,155,715

ADJUSTABLE PLOW HITCH

Filed April 4, 1938

INVENTOR.
WILLIAM E. KNAPP
BY Andrew E. Carlsen
ATTORNEY.

Patented Apr. 25, 1939

2,155,715

UNITED STATES PATENT OFFICE 2,155,715

ADJUSTABLE PLOW HITCH

William E. Knapp, Moline, Ill., assignor to Minneapolis-Moline Power Implement Company, Minneapolis, Minn., a corporation of Delaware Application April 4, 1938, Serial No. 199,922

3 Claims. (Cl. 97—107)

This invention relates to adjustable plow hitches.

In plows of the frameless type with which this invention deals, the plow bodies are mounted upon parallel plow beams extending longitudinally and these beams are supported upon wheels connected by rotatable crank axles journaled transversely across the beams to allow the plow bodies to be raised and lowered. The parallel plow beams are ordinarily joined by front and rear transverse braces and an adjustable hitch of some kind is connected to the frontal ends of the beams to apply the draft to the plow.

This conventional assembly has a number of disadvantages, chief of which is the fact that the assembly of plow beams and braces forms a quadrilateral framework of such nature that a torsional reaction or twisting action is set up at the frontal end which is very difficult to eliminate. Inasmuch as the plow beams cannot be permanently connected but must be removable when necessary for alteration or repairs, it obviously is impossible to form an integral or welded assembly and the frontal brace upon which the greatest strain occurs thus must be bolted in place. This, of course, makes it impossible to employ a tubular or other desirable section for the cross brace such as would more efficiently resist the stresses set up and support the plow beams thereagainst. Furthermore, there is a substantial duplication of cross members at the frontal end of the beams inasmuch as the draft connection, usually consisting of flat plates adjustably connected to the beams, are themselves necessarily joined by a cross member in order that the hitch may be raised and lowered as required.

Having in mind the defects of the ordinary assembly as briefly outlined above, it is the primary object of this invention to provide a hitch unit wherein a brace is integrally embodied and which is so arranged that it will serve to more efficiently brace the frontal ends of the beams and hold them in proper alignment and at the same time will serve as a rigid connection between the lateral members of the hitch itself. The single brace thus serves the purpose of both the usual frontal cross brace of the beams and the connecting member or brace for the draft hitch members. Another, and important object is to provide a hitch assembly of this kind in which the lateral members thereof are adjustably and removably mounted alongside the frontal ends of the plow beam and are joined by the cross member aforesaid. The assembly thus permits the use of a tubular section for the cross member (which is welded to the lateral members) so that the cross member will efficiently resist and overcome the lateral stresses placed thereon while, at the same time due to the removable mounting of the lateral members of the hitch, the beams may be readily dismounted when desired. A further object is to provide a hitch and brace unit of this kind in a simple and inexpensive form.

The foregoing and other objects of the invention will be made apparent in the course of the following detailed specification, reference being had to the accompanying drawing wherein.

Figure 1:
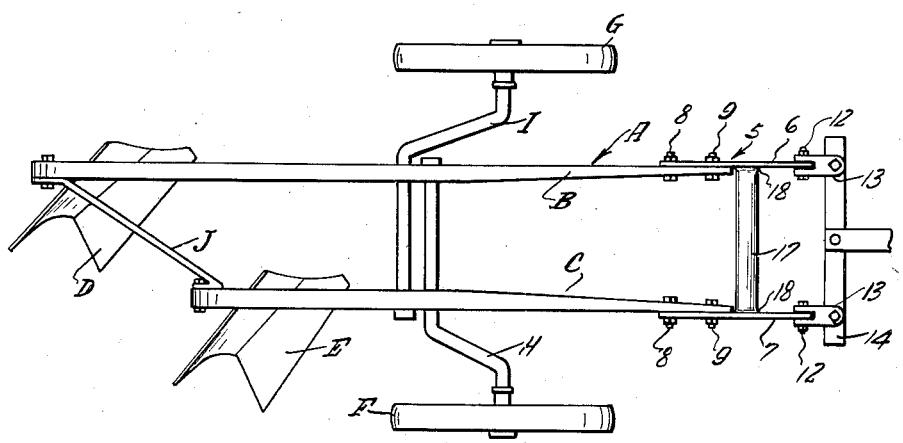
Fig. 1 is a plan view of a plow showing the improved hitch connected thereto.
Figure 2:
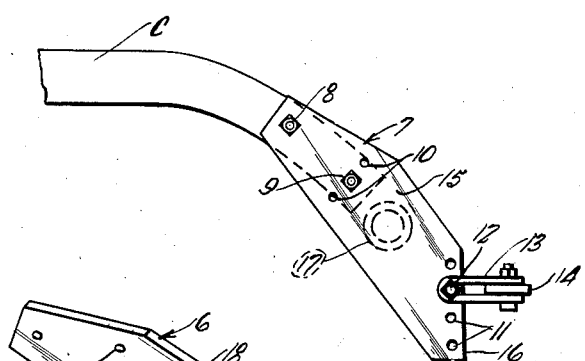
Fig. 2 is an enlarged side elevation of the frontal end of the plow beam showing the hitch thereon.
Figure 3:
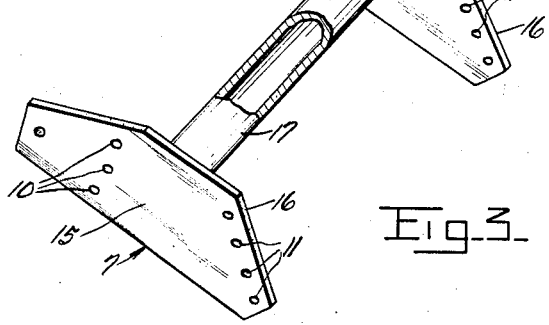
Fig. 3 is a perspective view of the hitch assembly alone.

Referring more particularly and by reference characters to the drawing, A designates a plow of substantially conventional form comprising the parallel plow beams B and C supporting the plow bodies D and E and the furrow and land wheels F and G which are journaled by crank axles H and I on the beams so that they may swing thereon to raise and lower the plow bodies. The usual power lift mechanism (not shown) may be employed for this purpose.

The plow beams B and C are connected at their rear ends by the diagonal rear cross brace J and ordinarily a similar brace is extended transversely between the frontal ends of the beams and at right angles to the beams. This frontal brace is entirely eliminated in accordance with my invention.

The present invention, therefore, provides a hitch assembly or unit, designated generally at 5, and made up of two draft plates or side bars 6 and 7 of identical construction and shape, and which are pivotally connected at their rear end portions to the beams B and C by means of bolts 8. These draft plates 6 and 7 are disposed along the outer vertical sides of the beams B and C and the bolts 8 are located rearwardly of the frontal ends of the beams some distance so that another bolt 9 passed through each of these frontal ends of the beams may be extended through any one of a series of openings 10 formed in the draft plates to thus permit vertical adjustment of the plates relative to the beams. In this operation the draft plates pivot in the bolts 8 and the openings 10 are all, of course, located the same radial distance from these bolts.

The draft plates 5 and 6 extend forwardly from the beams B and C some distance and are provided at their frontal marginal portions with a series of openings 11 through any of which bolts 12 may be placed to support the clevises 13 which are extended and connected to a transverse draft bar 14. The shape of the draft plates 6 and 7 is such that they taper toward their opposite front and rear ends, thus forming the widened medial portions 15, and the front ends 16 are cut off angularly with respect to the longitudinal axes of the plates so that the openings 11 spaced along the ends 16 will extend in a substantially vertical line in order to permit vertical adjustment of the clevises 13 and draft bar 14 irrespective of the vertical adjustment of the plates themselves. The frontal extremities of the beams B and C are ordinarily curved downwardly somewhat themselves and the draft plates 6 and 7 are accordingly cut off quite sharply at their aforesaid ends 16 so as to properly locate the openings 11 thereat.

Adjacent, or at their widened medial portions 15 the draft plates are joined by a transversely extended tie or bracing member 17 which is welded at its extremities at 18 to the inner sides of the plates. The tie member 17 thus serves to rigidly connect the two draft plates so that the entire assembly will move as a unit. The tie member is made of tubular material and this construction has a very marked advantage as will appear.

In use, the draft plates 6 and 7 are pivotally connected by the bolts 8 to the plow beams B and C as described and they are moved upwardly or downwardly to locate the draft bar 14 at the desired level above the ground. The bolts 9 are then inserted through the proper openings 10 and the bolts 8 and 9 are tightened to rigidly anchor the draft plates to the beams. In this condition the draft plates actually serve as rigid extensions of the beams themselves. Therefore, since these plates are rigidly joined by the tie member 17, this member will serve also to brace the frontal ends of the plow beams and maintain them in proper alignment. Accordingly, the single tie member now serves both to brace the plow beams and to connect and brace the draft plates and draft connection, entirely eliminating the necessity for a brace between the frontal ends of the beams as heretofore used.

The tie member 17, being welded to the draft plates as described, may be of tubular stock and thus, due to the well known stress resisting abilities of such a section, the member will much more efficiently brace the beams and resist the torsional or twisting stresses set up therein than will a flat bar as hitherto employed for the brace.

The use of flat stock for the brace has been required by the fact that the brace had to be bolted in place in order that it could be removed from the beams. In this invention, however, the draft plates 6 and 7 may be readily removed simply by loosening the bolts 8 and 9 and the tie member, therefore, may be, and is, formed of tubular section welded in place.

It will be noted (particularly in Fig. 1) that the draft plates 6 and 7 and connecting tie member 17 form a substantially H-shaped assembly and that the legs as defined by the rear portions of the draft plates are bolted against the frontal ends of the plow beams B—C and are supported thereby almost to the ends of the member 17 itself. As a result the tie member is very rigidly connected to the plow beams and no play can possibly occur between the plow beams and the tie member. It will be noted, furthermore, that the member 17 is extended between the wider medial portions 15 of the draft plates which further strengthens the assembly.

The provision of a series of openings 11 in a substantially vertical line permits adjustment of the draft hitch to various heights without disturbing the mounting of the draft plates and, taken in connection with the height adjustment of these plates, these openings permit a great variety of adjustments as will be readily evident.

It will also be understood that the assembly may be extended to apply to plows having more than two beams simply by duplicating the parts as required.

While I have herein set forth a certain preferred embodiment of my invention, it is understood that I may vary from the same in minor structural details, not departing from the spirit of the invention and within the scope of the appended claims.

Having thus fully disclosed my invention, what I claim as new and desire to secure by Letters Patent is:

1. A draft hitch for the frontal ends of plow beams, the same comprising elongated draft plates pivotally adjustable at their rear ends on the beams and extended forwardly therefrom for vertical adjustment at their frontal ends, means securing the draft plates to the beams in adjusted position relative thereto, a hollow cross member rigidly secured at its ends between the draft plates forwardly of the said beams, and a draft bar adjustably connected to the frontal ends of the draft plates.

2. A draft hitch for the frontal ends of plow beams, the same comprising elongated draft plates adjustably connected at their rear ends to the beams and extended forwardly therefrom for vertical adjustment at their frontal ends, means securing the draft plates to the beams in adjusted position relative thereto, a hollow cross member rigidly secured at its ends between the draft plates forwardly of the said beams, the frontal extremities of the draft plates each having a series of vertically spaced openings, and a draft bar adjustably connected and mounted in the said openings for vertical adjustment independently of the vertical adjustment of the draft plates.

3. A hitch for the frontal end of a pair of transversely spaced plow beams, comprising a pair of side members pivotally secured to the respective beams and extending forwardly therefrom whereby the front ends of the members may be adjusted vertically, means for securing the members in selectively adjusted positions, a tubular cross member disposed between the side members and rigidly connecting the same, and a draft element attached to the frontal ends of the side members.

WILLIAM E. KNAPP.